(12) United States Patent
Suzuki et al.

(10) Patent No.: US 10,527,975 B2
(45) Date of Patent: Jan. 7, 2020

(54) METHOD FOR MANUFACTURING INTERMEDIATE TRANSFER BELT AND IMAGE FORMING DEVICE

(71) Applicant: Konica Minolta, Inc., Tokyo (JP)

(72) Inventors: Takayuki Suzuki, Niiza (JP); Junji Ujihara, Hachioji (JP); Tsuyoshi Shimoda, Kokubunji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/241,430

(22) Filed: Jan. 7, 2019

(65) Prior Publication Data

US 2019/0227462 A1     Jul. 25, 2019

(30) Foreign Application Priority Data

Jan. 23, 2018    (JP) ................ 2018-009049

(51) Int. Cl.
     *B32B 27/34*      (2006.01)
     *G03G 15/16*      (2006.01)

(52) U.S. Cl.
     CPC .......... *G03G 15/162* (2013.01); *B32B 27/34* (2013.01); *B32B 2255/10* (2013.01); *G03G 2215/1623* (2013.01)

(58) Field of Classification Search
     CPC .............. G03G 15/162; B32B 2255/10; C23C 18/1868
     USPC ......................................................... 427/554
     See application file for complete search history.

(56) References Cited

U.S. PATENT DOCUMENTS

| | | | |
|---|---|---|---|
| 2007/0194156 A1* | 8/2007 | Pirrie .................... | A61M 15/02 239/690 |
| 2013/0020297 A1* | 1/2013 | Gupta .................... | B23K 26/12 219/121.72 |
| 2016/0158799 A1* | 6/2016 | Shimoda ................ | B05D 3/067 427/508 |

FOREIGN PATENT DOCUMENTS

| | | | |
|---|---|---|---|
| JP | 11352802 A | * | 12/1999 |
| JP | H11-352802 A | | 12/1999 |
| JP | 2014109586 A | | 6/2014 |

\* cited by examiner

*Primary Examiner* — Dah-Wei D. Yuan
*Assistant Examiner* — Nga Leung V Law
(74) *Attorney, Agent, or Firm* — Lucas & Mercanti, LLP

(57) ABSTRACT

A method for manufacturing an intermediate transfer belt having at least a base layer and a surface layer formed in contact with a surface of the base layer, includes: irradiating a surface of the base layer with a laser such that Rz (in accordance with JIS-B0601-2001) is 0.2 μm or more and equal to or less than a half of a film thickness of a surface layer to be formed; and forming a surface layer on the surface of the base layer irradiated with the laser.

9 Claims, 1 Drawing Sheet

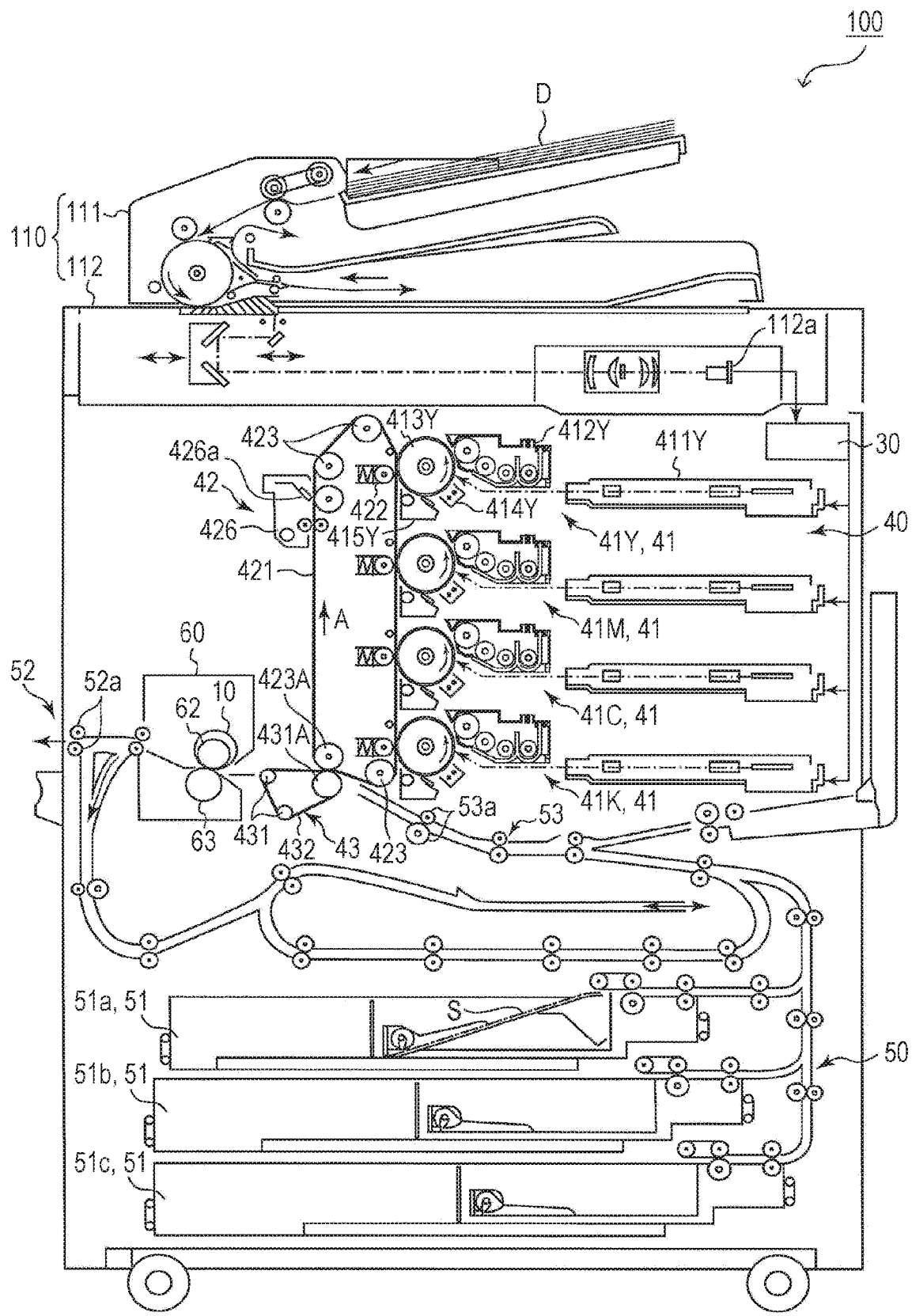

METHOD FOR MANUFACTURING INTERMEDIATE TRANSFER BELT AND IMAGE FORMING DEVICE

The entire disclosure of Japanese patent Application No. 2018-009049, filed on Jan. 23, 2018, is incorporated herein by reference in its entirety.

BACKGROUND

Technological Field

The present invention relates to a method for manufacturing an intermediate transfer belt, and an image forming device including an intermediate transfer belt manufactured by the method.

Description of the Related Art

In an electrophotographic image forming device, usually, a toner image formed by a photoreceptor is primarily transferred onto an intermediate transfer body and then secondarily transferred onto a recording medium such as plain paper. As the intermediate transfer body, an endless belt (intermediate transfer belt) is known. As the intermediate transfer belt, an intermediate transfer belt having a base layer made of a resin and a surface layer disposed on the base layer and improving releasability of toner and durability of the intermediate transfer belt is known (for example, JP 2014-109586 A).

Note that JP 11-352802 A discloses a transfer conveyance belt including a belt body and an abrasion-resistant layer laminated on a surface of the belt body on which a transfer material is placed, in which adhesion of the abrasion-resistant layer can be enhanced by an anchor effect, and abrasion of the abrasion-resistant layer at the time of cleaning can be suppressed by polishing and roughing the surface of the belt body so as to have a surface roughness (Rz) of 1.8 to 15.0 μm.

However, even in an image forming device including such an intermediate transfer belt having a surface layer as described in JP 2014-109586 A, occurrence of image defects after long-term use cannot be completely suppressed. Meanwhile, if a surface of a base layer is polished and roughened as described in JP 11-352802 A, adhesion and abrasion resistance of the surface layer are enhanced, partial peeling or cracking of the surface layer is suppressed, and it is considered that image defects derived therefrom can also be suppressed. However, according to findings of the present inventors, even when a surface of a base layer is polished and roughened as described in JP 11-352802 A, image defects after long-term use cannot be sufficiently suppressed.

SUMMARY

In view of the above problems, an object of the present invention is to provide a method for manufacturing an intermediate transfer belt capable of suppressing occurrence of image defects even after long-term use, and an image forming device including an intermediate transfer belt manufactured by the method.

To achieve the abovementioned object, according to an aspect of the present invention, a method for manufacturing an intermediate transfer belt having at least a base layer and a surface layer formed in contact with a surface of the base layer, reflecting one aspect of the present invention comprises: irradiating a surface of the base layer with a laser such that Rz (in accordance with JIS-B0601-2001) is 0.2 μm or more and equal to or less than a half of a film thickness of a surface layer to be formed; and forming a surface layer on the surface of the base layer irradiated with the laser.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 1 is a view schematically illustrating the configuration of an example of an image forming device including an intermediate transfer belt manufactured by a manufacturing method according to an embodiment of the present invention.

DETAILED DESCRIPTION OF EMBODIMENTS

Hereinafter, one or more embodiments of the present invention will be described with reference to the drawings. However, the scope of the invention is not limited to the disclosed embodiments.

[Method for Manufacturing Intermediate Transfer Belt]

An embodiment of the present invention relates to a method for manufacturing an intermediate transfer belt having at least a base layer and a surface layer formed in contact with a surface of the base layer. The present embodiment includes a step of irradiating a surface of the base layer with a laser such that Rz (in accordance with JIS-B0601-2001) is 0.2 μm or more and equal to or less than a half of the film thickness of a surface layer to be formed, and a step of forming a surface layer on the surface of the base layer irradiated with the laser.

(Step of Emitting Laser)

In this step, a surface of the base layer is irradiated with a laser.

The above base layer only needs to be an intermediate transfer belt that can be included in an electrophotographic image forming device. For example, the intermediate transfer belt includes a resin and a conductive filler. By adding the conductive filler to the resin, conductivity can be imparted to the resin and an electric function can be imparted thereto.

The resin for forming the base layer is not particularly limited, and various resins can be used. Examples of the resin include a resin having a structural unit containing a benzene ring, such as aromatic polyimide (PI), aromatic polyamide imide (PAI), polyphenylene sulfide (PPS), aromatic polyether ether ketone (PEEK), aromatic polycarbonate, or aromatic polyether ketone, polyvinylidene fluoride, and a mixture or a copolymer thereof. Among these resins, it is preferable to form a base layer using a resin having a structural unit containing a benzene ring, and it is more preferable to form a base layer using a resin selected from the group consisting of polyimide (PI), polyamide imide (PAI), and polyphenylene sulfide (PPS) from a viewpoint of further enhancing flame retardancy, strength, and durability. Furthermore, it is still more preferable to form a base layer using polyphenylene sulfide (PPS) from a viewpoint of reducing manufacturing cost.

Note that the base layer may be formed of a crystalline resin. Here, the crystalline resin is a resin containing a "crystal" in which molecular chains are regularly arranged and having a glass transition temperature and a melting point. The crystalline resin can be confirmed in the base layer by, for example, a differential scanning calorimeter (DSC) and an X-ray diffraction device. Examples of the crystalline resin include polyphenylene sulfide (PPS) and polyether ether ketone (PEEK).

Phenylene in the polyphenylene sulfide (PPS) preferably contains p-phenylene, and more preferably contains unsubstituted p-phenylene. The content of substituted or unsubstituted p-phenylene in the polyphenylene sulfide is preferably 50% or more of the entire phenylene.

Examples of the conductive filler include a conductive carbon-based material such as carbon black or a carbon nanotube, a metal or an alloy such as aluminum or a copper alloy, and a conductive metal oxide such as tin oxide, zinc oxide, antimony oxide, indium oxide, potassium titanate, antimony oxide-tin oxide complex oxide (ATO), or indium oxide-tin oxide complex oxide (ITO). These conductive fillers can be used singly or in combination of two or more kinds thereof. As the conductive filler, carbon black that is a conductive carbon-based material is preferable. The carbon black may have a surface that has been oxidized.

In addition, the base layer may contain another material as necessary. Examples of the other material include a dispersant and a lubricant.

The above dispersant is not particularly limited as long as an effect of the present invention is not impaired. For example, in a case where polyphenylene sulfide (PPS) or polyether ether ketone (PEEK) is used as the resin, the dispersant is preferably an ethylene glycidyl methacrylate-acrylonitrile styrene copolymer from viewpoints of compatibility with the resin and dispersibility of the conductive filler.

Examples of the lubricant include an aliphatic hydrocarbon-based compound such as paraffin wax or polyolefin wax, and a higher fatty acid such as lauric acid, myristic acid, palmitic acid, stearic acid, behenic acid, or montanic acid and a metal salt thereof. These lubricants can be used singly or in combination of two or more kinds thereof.

Furthermore, an elastic material may be added to the base layer. Examples of the elastic material include polyurethane, chlorinated polyisoprene, NBR, chloropyrene rubber, EPDM, hydrogenated polybutadiene, butyl rubber, and silicone rubber. These materials may be used singly or in combination of two or more kinds thereof.

The shape of the base layer only needs to be substantially the same as that of an intermediate transfer belt to be manufactured, and needs to be, for example, an endless belt shape.

The thickness of the base layer is preferably 50 to 250 μm from viewpoints of further enhancing mechanical strength and reducing manufacturing cost.

A surface of the base layer on which a surface layer is to be formed is irradiated with the laser. For example, if the base layer has an endless belt shape, it is only required to irradiate a surface of the base layer facing the outside with the laser in a peripheral direction.

Examples of the laser with which a surface of the base layer is irradiated include a $CO_2$ laser having a wavelength of 10.6 μm, a $YVO_4$ laser and a YAG laser each having a wavelength of 1064 nm, and an SHG laser having a wavelength of 532 nm. In order to suppress an influence of heat on the entire base layer and to efficiently absorb emitted light on the surface of the base layer, the laser preferably has an irradiation wavelength in a visible light region, and is more preferably an SHG laser. Here, the visible light region means a wavelength range of 380 nm to 780 nm.

By treating a surface of the base layer with a laser, even in a case where equal surface roughness is achieved, it is possible to develop stronger adhesion between the base layer and the surface layer than in a case where a treatment is performed by mechanical polishing such as a grinder. In addition, by treating a surface of the base layer with a laser, it is possible to develop stronger adhesion between the base layer and the surface layer than in a case where the base layer is surface-modified by a corona treatment or the like. This is presumed to be because the chemical structure of a resin present on the surface of the base layer is changed by energy of the emitted laser to increase the adhesion to the surface layer.

The laser is emitted such that Rz of the surface of the base layer is 0.2 μm or more. In addition, the laser is emitted such that Rz of the base layer is equal to or less than a half of the film thickness of a surface layer to be formed in a later process. By emitting the laser as described above, image defects hardly occur. It is considered that this may be because Rz of 0.2 μm makes the base layer and the surface layer adhere to each other more strongly by an anchor effect to make peeling of the surface layer less likely to occur. In addition, it is considered that this is because Rz of equal to or less than a half of the film thickness of the surface layer reduces an influence of surface roughness (irregularities of the surface) of the surface-treated base layer, and makes it possible to uniform the film thickness of the surface layer, and therefore can suppress occurrence of a portion having inferior durability and occurrence of resistance unevenness caused by variation in film thickness.

Rz of the base layer is measured in accordance with JIS-B0601-2001. Here, Rz is a parameter in a height direction, called "maximum height", and indicates the sum of the highest part (the maximum peak height Rp) and the deepest part (maximum valley depth: Rv) (Rz=Rp+Rv) when a part of a roughness curve measured by a roughness meter is extracted with a reference length.

Conditions for laser irradiation only need to be appropriately set such that Rz of the surface of the base layer falls within the above range.

(Step of Forming Surface Layer)

In this step, a surface layer is formed on the surface of the base layer irradiated with the laser.

A method for forming a surface layer is not particularly limited. For example, the step of forming a surface layer includes a step of applying a coating liquid containing a photocurable monomer to the surface of the base layer irradiated with the laser, and a step of irradiating the coating liquid that has been applied with an actinic ray.

In the step of forming a surface layer, it is preferable to form a surface layer having a surface layer film thickness of 0.5 μm or more and 6.0 μm or less. If the film thickness of the surface layer is 0.5 μm or more, an effect of improving durability by the surface layer is sufficiently exhibited. In addition, if the film thickness of the surface layer is 6.0 μm or less, the electric resistance of the entire laminated intermediate transfer belt is not easily increased, and therefore occurrence of image defects can be suppressed.

The surface layer is formed preferably within 10 hours, more preferably within 7 hours, and still more preferably within 5 hours after the step of emitting a laser.

The coating liquid preferably contains a photocurable monomer and a metal oxide. The coating liquid may contain another component as long as an effect of the present invention is not impaired. Examples of the other component include a solvent, a lubricity aid, a photopolymerization initiator, and a stabilizer.

The photocurable monomer is a resin material that is polymerized and crosslinked by irradiation with an actinic ray (mainly ultraviolet ray). Examples of the photocurable monomer include a radically polymerizable monomer.

Examples of the radically polymerizable monomer include various monomers such as a styrene-based monomer, an acrylic monomer, a methacrylic monomer, a vinyl-toluene-based monomer, a vinyl acetate-based monomer, and an N-vinylpyrrolidone-based monomer.

The radically polymerizable monomer is preferably a compound having a (meth)acryloyloxy group from a viewpoint of saving irradiation energy of an actinic ray or shortening time required for manufacturing work. Furthermore, the radically polymerizable monomer is preferably a (meth)acrylate-based monomer, and in particular, more preferably a polyfunctional (meth)acrylate-based monomer in order to form a surface layer having adhesion to the base layer, and having sufficient mechanical strength to protect the base layer and flexibility capable of following deformation of the base layer. Note that the "(meth)acryloyloxy group" is a generic term for an acryloyloxy group and a methacryloyloxy group, and means one or both of these groups. The (meth)acrylate means an acrylate and a methacrylate.

Examples of the polyfunctional (meth)acrylate-based monomer include dipentaerythritol hexaacrylate (DPHA), ethylene oxide-modified dipentaerythritol hexaaciylate (DPEA), propylene oxide-modified dipentaerythritol hexaacrylate (DPPA), and caprolactone-modified pentaerythritol hexaaciylate (DPCA). In particular, trifunctional or higher functional pentaerythritol triacrylate or the like is effective for largely shortening curing time because of quickly reacting and being cured by irradiation with an actinic ray, and can enhance mechanical strength such as solvent resistance or scratch resistance.

One or more kinds of the above metal oxides are preferably added from a viewpoint of enhancing durability of the surface layer. Examples of the metal oxide include silica, titanium oxide, tin oxide, alumina, and zinc oxide. Among these oxides, titanium oxide, alumina, tin oxide, and the like are preferable, and tin oxide is particularly preferable.

The metal oxide is preferably surface-treated. The surface treatment may be a treatment of physically carrying a coating component such as a resin on a surface of the metal oxide or a treatment of chemically bonding a reactive compound to a surface of the metal oxide. Examples of a treatment method for chemically bonding a reactive compound to a surface of the metal oxide include a coupling treatment with a silane coupling agent. The silane coupling agent preferably has a radically polymerizable functional group such as a (meth)acryloyloxy group from a viewpoint of improving dispersibility of the metal oxide in the surface layer and mechanical strength of the surface layer. Examples of the silane coupling agent include the following compounds S-1 to S-31.

S-1: $CH_2=CHSi(CH_3)(OCH_3)_2$
S-2: $CH_2=CHSi(OCH_3)_3$
S-3: $CH_2=CHSiCl_3$
S-4: $CH_2=CHCOO(CH_2)_2Si(CH_3)(OCH_3)_2$
S-5: $CH_2=CHCOO(CH_2)_2Si(OCH_3)_3$
S-6: $CH_2=CHCOO(CH_2)_2Si(OC_2H_5)(OCH_3)_2$
S-7: $CH_2=CHCOO(CH_2)_3Si(OCH_3)_3$
S-8: $CH_2=CHCOO(CH_2)_2Si(CH_3)O_2$
S-9: $CH_2=CHCOO(CH_2)_2SiCl_3$
S-10: $CH_2=CHCOO(CH_2)_3Si(CH_3)O_2$
S-11: $CH_2=CHCOO(CH_2)_3SiCl_3$
S-12: $CH_2=C(CH_3)COO(CH_2)_2Si(CH_3)(OCH_3)_2$
S-13: $CH_2=C(CH_3)COO(CH_2)_2Si(OCH_3)_3$
S-14: $CH_2=C(CH_3)COO(CH_2)_3Si(CH_3)(OCH_3)_2$
S-15: $CH_2=C(CH_3)COO(CH_2)_3Si(OCH_3)_3$
S-16: $CH_2=C(CH_3)COO(CH_2)_2Si(CH_3)Cl_2$
S-17: $CH_2=C(CH_3)COO(CH_2)_2SiCl_3$
S-18: $CH_2=C(CH_3)COO(CH_2)_3Si(CH_3)Cl_2$
S-19: $CH_2=C(CH_3)COO(CH_2)_3SiCl_3$
S-20: $CH_2=CHSi(C_2H_5)(OCH_3)_2$
S-21: $CH_2=C(CH_3)Si(OCH_3)_3$
S-22: $CH_2=C(CH_3)Si(OC_2H_5)_3$
S-23: $CH_2=CHSi(OCH_3)_3$
S-24: $CH_2=C(CH_3)Si(CH_3)(OCH_3)_2$
S-25: $CH_2=CHSi(CH_3)Cl_2$
S-26: $CH_2=CHCOOSi(OCH_3)_3$
S-27: $CH_2=CHCOOSi(OC_2H_5)_3$
S-28: $CH_2=C(CH_3)COOSi(OCH_3)_3$
S-29: $CH_2=C(CH_3)COOSi(OC_2H_5)_3$
S-30: $CH_2=C(CH_3)COO(CH_2)_3Si(OC_2H_5)_3$
S-31: $CH_2=CHCOO(CH_2)_2Si(CH_3)_2(OCH_3)$

The solvent can be appropriately selected from compounds having compatibility with a material contained in the coating liquid containing the radically polymerizable monomer. The solvent may be used singly or in combination of two or more kinds thereof. Examples of the solvent include propylene glycol monomethyl ether acetate (PMA), n-butyl alcohol, isopropyl alcohol, ethyl alcohol, methyl alcohol, methyl isobutyl ketone, methyl ethyl ketone, acetone, diethyl ketone, tetrahydrofuran, ethyl acetate, and butyl acetate. The content of the solvent in the coating liquid can be determined, for example, based on coatability of the coating liquid, and is, for example, an amount that makes the concentration of a solid content in the coating liquid 3 to 30% by mass.

The lubricity aid is a fluoro group-containing component that contributes to lowering surface energy of a surface of the surface layer when being located on the surface, and is preferable from a viewpoint of preventing adhesion of an adhesion portion to the surface layer or a viewpoint of enhancing lubricity on the surface of the surface layer. The lubricity aid preferably has a radically polymerizable functional group from a viewpoint of enhancing dispersibility in the surface layer. Examples of such a lubricity aid include Megafac RS-55, RS-56, RS-72-K, RS-75, RS-76-E, RS-76-NS, RS-78, and RS-90 (manufactured by DIC Corporation).

The content of the lubricity aid in the surface layer can be appropriately determined within a range where an effect by the lubricity aid is obtained, and is, for example, 1 to 20 parts by mass with respect to 100 parts by mass of the radically polymerizable monomer.

The photopolymerization initiator may be used singly or in combination of two or more kinds thereof. Examples of the photopolymerization initiator include benzophenone, Michler's ketone, 1-hydroxycyclohexyl-phenylketone, thioxanthone, benzobutyl ether, acyloxime ester, dibenzosuroben, and bisacylphosphine oxide. The content of the photopolymerization initiator in the coating liquid is, for example, preferably 0.1 to 30 parts by mass, and more preferably 0.5 to 10 parts by mass with respect to 100 parts by mass of the radically polymerizable monomer.

The stabilizer is, for example, a component contributing to stabilization (prevention of denaturation) of the surface layer, and may be used singly or in combination of two or more kinds thereof. Examples of the stabilizer include a phenol-based antioxidant, an amine-based antioxidant, a hydroquinone-based antioxidant, a sulfur-based antioxidant, and a phosphoric acid-based antioxidant. The content of the stabilizer in the coating liquid is, for example, preferably 2 to 10 parts by mass, and more preferably 2 to 5 parts by mass with respect to 100 parts by mass of the radically polymerizable monomer The photocurable monomer forming the surface layer of the intermediate transfer belt is preferably a polyfunctional (meth)acrylate, and the resin forming the base layer is preferably polyphenylene sulfide (PPS).

The coating liquid can be applied to a surface of the base layer irradiated with the laser by a method using a bar coater, a roll coater, or the like, a dipping method, or the like.

The actinic ray is an electromagnetic wave that radically polymerizes a photocurable monomer, that is, a radically polymerizable monomer, and examples thereof include an ultraviolet ray, an electron ray, and a gamma ray. Among these rays, the actinic ray is preferably an ultraviolet ray or an electron ray, and is more preferably an ultraviolet ray from a viewpoint that handling is easy and high energy can be easily obtained.

The kind of a light source of the actinic ray is preferably a low pressure mercury lamp, a medium pressure mercury lamp, an extra high pressure mercury lamp, a carbon arc lamp, a metal halide lamp, a xenon lamp, a flash (pulse) xenon, or a UV-LED irradiation device including UV-LED.

(Step of Forming Base Layer)

The method for manufacturing an intermediate transfer belt may include a step of forming a base layer before the step of emitting a laser. The step of forming a base layer includes a step of melt-kneading a mixture containing a resin as the above-described material and a conductive filler, and a step of molding the mixture into the shape of an intermediate transfer belt by an extrusion method or the like.

(Image Forming Device)

Another embodiment of the present invention relates to an image forming device including an intermediate transfer belt manufactured by the above manufacturing method.

FIG. 1 is a view schematically illustrating an example of the configuration of the image forming device. An image forming device 100 illustrated in FIG. 1 includes an image reader 110, an image processor 30, an image former 40, a sheet conveyor 50, and a fixing device 60.

The image former 40 includes image forming units 41Y, 41M, 41C, and 41K that form images using toners of yellow (Y), magenta (M), cyan (C), and black (K), respectively. These units have the same configuration except for a toner to be housed therein, and therefore symbols representing colors may be omitted below. The image former 40 further includes an intermediate transfer unit 42 and a secondary transfer unit 43. These units correspond to a transfer device.

The image forming unit 41 includes an exposing device 411, a developing device 412, an image carrier 413, a charging device 414, and a drum cleaning device 415. The charging device 414 is, for example, a corona charger. The charging device 414 may be a contact charging device that charges a contact charging member such as a charging roller, a charging brush, or a charging blade in contact with the image carrier 413. The exposing device 411 includes, for example, a semiconductor laser as a light source and a light deflecting device (polygon motor) that emits a laser according to an image to be formed toward the image carrier 413. The developing device 412 is a two-component developing type developing device and houses a two-component developer.

The intermediate transfer unit 42 includes an intermediate transfer belt 421, a primary transfer roller 422 that presses the intermediate transfer belt 421 against the image carrier 413, a plurality of support rollers 423 including a backup roller 423A, and a belt cleaning device 426.

The intermediate transfer belt 421 has a base layer and a surface layer manufactured by the above-described manufacturing method. The belt cleaning device 426 includes an elastic cleaning blade 426a in contact with the intermediate transfer belt 421. The intermediate transfer belt 421 is stretched in a loop shape around the plurality of support rollers 423. By rotation of at least one driving roller of the plurality of support rollers 423, the intermediate transfer belt 421 travels at a constant speed in a direction of the arrow A.

The secondary transfer unit 43 includes an endless secondary transfer belt 432 and a plurality of support rollers 431 including a secondary transfer roller 431A. The secondary transfer belt 432 is stretched in a loop shape by the secondary transfer roller 431A and the support rollers 431.

The fixing device 60 includes, for example, a fixing roller 62, an endless heat generating belt 10 for coating an outer peripheral surface of the fixing roller 62 and heating and melting toner constituting a toner image on a sheet S, and a pressure roller 63 that presses the sheet S against the fixing roller 62 and the heat generating belt 10. The sheet S corresponds to a recording medium.

The image reader 110 includes a sheet feeding device 111 and a scanner 112. The sheet conveyor 50 includes a sheet feeder 51, a sheet discharger 52, and a conveying path 53. Three sheet feeding tray units 51a to 51c constituting the sheet feeder 51 house the sheets S (standard sheet and special sheet) identified based on basis weight, size, and the like according to the kind set in advance. The conveying path 53 includes a plurality of conveying roller pairs such as a resist roller pair 53a.

Formation of an image by the image forming device 100 will be described.

The scanner 112 optically scans and reads a document D on a contact glass. Reflected light from the document D is read by a CCD sensor 112a and becomes input image data. The input image data is subjected to predetermined image processing in the image processor 30 and sent to the exposing device 411.

The image carrier 413 rotates at a constant peripheral speed. The charging device 414 negatively charges a surface of the image carrier 413 uniformly. In the exposing device 411, a polygon mirror of the polygon motor rotates at a high speed, a laser corresponding to input image data of each color component develops in an axial direction of the image carrier 413, and an outer peripheral surface of the image carrier 413 is irradiated with the laser in the axial direction. In this way, an electrostatic latent image is formed on the surface of the image carrier 413.

In the developing device 412, the two-component developer in the developing container is stirred and conveyed to charge toner particles, conveyed to a developing roller, and forms a magnetic brush on a surface of the developing roller. The charged toner particles electrostatically adhere to an electrostatic latent image portion on the image carrier 413 from the magnetic brush. In this way, the electrostatic latent image on the surface of the image carrier 413 is visualized, and a toner image corresponding to the electrostatic latent image is formed on the surface of the image carrier 413. Note that the "toner image" refers to a state in which toner is aggregated in an image shape.

The toner image on the surface of the image carrier 413 is transferred onto the intermediate transfer belt 421 by the intermediate transfer unit 42. A transfer residual toner remaining on the surface of the image carrier 413 after the transfer is removed by the drum cleaning device 415 having a drum cleaning blade in sliding contact with the surface of the image carrier 413.

The primary transfer roller 422 presses the intermediate transfer belt 421 against the image carrier 413. As a result, a primary transfer nip is formed for each image carrier by the image carrier 413 and the intermediate transfer belt 421. At the primary transfer nip, a toner image of each color is sequentially superposed and transferred onto the intermediate transfer belt 421.

Meanwhile, the secondary transfer roller 431A is pressed against the backup roller 423A via the intermediate transfer belt 421 and the secondary transfer belt 432. As a result, a secondary transfer nip is formed by the intermediate transfer belt 421 and the secondary transfer belt 432. The sheet S passes through the secondary transfer nip. The sheet S is conveyed to the secondary transfer nip by the sheet conveyor 50. Correction of an inclination of the sheet S and adjustment of the timing of conveyance are performed by a resist roller unit having the resist roller pair 53a disposed therein.

When the sheet S is conveyed to the secondary transfer nip, a transfer bias is applied to the secondary transfer roller 431A. By application of this transfer bias, a toner image carried on the intermediate transfer belt 421 is transferred onto the sheet S. The sheet S onto which the toner image has been transferred is conveyed toward the fixing device 60 by the secondary transfer belt 432.

In the fixing device 60, the heat generating belt 10 and the pressure roller 63 form a fixing nip, and the fixing nip heats and presses the sheet S that has been conveyed. In this way, the toner image is fixed to the sheet S. The sheet S to which the toner image has been fixed is discharged to the outside of the device by the sheet discharger 52 having a discharge roller 52a.

Note that a transfer residual tone remaining on a surface of the intermediate transfer belt 421 after the secondary transfer is removed by the cleaning blade 426a. The surface layer of the intermediate transfer belt 421 is abraded by friction with the cleaning blade 426a. However, as described above, since the intermediate transfer belt 421 has a surface layer that has been uniformly cured in a surface direction thereof, the intermediate transfer belt 421 is abraded uniformly by friction with the cleaning blade 426a to prevent uneven abrasion. Therefore, desired transfer performance by the intermediate transfer belt 421 is exhibited over a long period of time, and occurrence of transfer failure due to uneven abrasion and image failure resulting therefrom is suppressed over a long period of time.

EXAMPLES

The present invention will be described more specifically using the following tests. Note that the present invention is not limited to the following tests.

[Test 1]

(Preparation of Base Layer)

The following components were put in the following amounts in a single screw extruder and melt-kneaded to prepare a resin mixture.

Resin: 100 parts by volume
Conductive filler: 16 parts by volume
Dispersant: 1 part by volume
Lubricant: 0.2 parts by volume The resin is polyphenylene sulfide (PPS), Torelina E2180 (manufactured by Toray Industries, Inc.). The conductive filler is carbon black, furnace #3030B (manufactured by Mitsubishi Chemical Corporation), which imparts an electric resistance value to a base layer. The dispersant is Modiper A4400 (manufactured by NOF CORPORATION), which imparts impact resistance to an engineering plastic and functions as a pigment dispersant. The lubricant is calcium montanate, Celidast 5551 (manufactured by Clariant International Ltd.). For melt-kneading, a single screw kneading extruder "IPM-65" (manufactured by CTE Co., Ltd.) was used.

The resin mixture was dried at 130° C. for eight hours and melted with a 40 mm diameter extruder equipped with a 6-spiral spiral annular die having a diameter of 150 mm and a lip width of 1 mm, and the melted product of the resin mixture was brought into contact with an outer surface of a cooling mandrel having an outer diameter of 239 mm disposed coaxially with the annular die via a support rod, cooled, and solidified to prepare a cylindrical molded body. While the molded body was stretched in a state of being held in a cylindrical shape by a core disposed inside the cylinder of the molded body and a roll disposed outside the cylinder, the molded body was cut into a length of 360 mm to obtain a base layer of an endless intermediate transfer belt. The thickness of the obtained base layer was 120 µm.

(Laser Treatment of Base Layer)

The base layer prepared above was irradiated with a laser using a laser marker "MD-S9920A" (manufactured by Keyence Corporation) having an irradiation wavelength of 532 nm. Incidentally, in the following tests, the laser was emitted by adjusting an output of the above apparatus within a range of 1.2 to 6 W, a scan speed within a range of 2000 to 8000 mm/s, a Q switch frequency within a range of 20 to 80 kHz, a defocus value within a range of −21 to +21 mm, and a line interval within a range of 20 to 400 µm.

Rz of the surface of the base layer irradiated with the laser was measured using "Surfcom 1400D" (manufactured by Tokyo Seimitsu Co., Ltd.) under the following conditions, and was 0.20 µm.

(Measurement Conditions)

Pickup (detector): E-DT-S03A
Measurement piece: DM43801 (tip radius: 2 µm, 60° conical diamond)
Parameter calculation standard: JIS B 0601-2001
Cutoff type: Gaussian
Leaning correction: least squares linear correction
Measurement length: 8.0 mm
Cutoff wavelength: 0.25 mm
Measurement speed: 0.3 mm/s (Preparation of Coating Liquid for Surface Layer)

The following components were mixed in the following amounts to prepare a mixed liquid.

Photocurable monomer: 85 parts by mass
Lubricity aid: 10 parts by mass
Metal oxide: 5 parts by mass The photocurable monomer is dipentaerythritol hexaacrylate (DPHA), KAYARAD DPHA (manufactured by Nippon Kayaku Co., Ltd.). In addition, the lubricity aid is a fluorine-based additive, Megafac RS-56 (manufactured by DIC Corporation), which is a polymerization component having a low surface energy group. The metal oxide is obtained by subjecting "Nanotech (CIK Nanotech Co., Ltd.)" (100 parts by mass) formed of tin oxide ultrafine particles to a coupling treatment with a silane coupling agent, KBM-503 (manufactured by Shin-Etsu Chemical Co., Ltd.)" (5 parts by mass).

DPHA, the lubricity aid, and the surface-treated tin oxide were dissolved in methyl ethyl ketone (MEK) as a solvent such that the viscosity of a coating liquid was 1 mPa·s and then dispersed therein to prepare the coating liquid. The viscosity of the coating liquid was measured with a viscometer "DV3TL (manufactured by EKO Instruments Co., Ltd.)" at a liquid temperature of 20° C.

(Formation of Surface Layer)

By setting time before applying the coating liquid to the surface of the base layer using a coating apparatus for dip coating to five minutes, a surface layer forming coating liquid was applied onto a surface of a resin base layer for an intermediate transfer body so as to have a dry film thickness of 0.5 μm to form a coating film. Next, while the base layer on which the coating film had been formed was held by a biaxial roller and rotated at a rotation speed of 10 mm/sec, the coating film was irradiated with an ultraviolet ray as an actinic ray under the following irradiation conditions to form a surface layer having a film thickness of 0.51 μm.

(Ultraviolet Ray Irradiation Conditions)

Type of light source: UV-LED lamp "UV-SPV series" (manufactured by Revox Inc.)

Wavelength of light source: 365 nm

Distance from irradiation port to surface of coating film: 40 mm

Irradiation light amount: 100 mw/cm$^2$

Irradiation time (time to rotate base): 150 seconds

[Test 2]

An intermediate transfer belt was manufactured in a similar manner to Test 1 except that the surface of the base layer was treated with a laser such that Rz of the base layer was 0.20 μm and a surface layer was formed such that the surface layer formed on the surface of the base layer had a film thickness of 4.2 μm.

[Test 3]

An intermediate transfer belt was manufactured in a similar manner to Test 1 except that the surface of the base layer was treated with a laser such that Rz of the base layer was 0.53 μm and a surface layer was formed such that the surface layer formed on the surface of the base layer had a film thickness of 2.1 μm.

[Test 4]

An intermediate transfer belt was manufactured in a similar manner to Test 1 except that the surface of the base layer was treated with a laser such that Rz of the base layer was 0.53 μm and a surface layer was formed such that the surface layer formed on the surface of the base layer had a film thickness of 4.3 μm.

[Test 5]

An intermediate transfer belt was manufactured in a similar manner to Test 1 except that the surface of the base layer was treated with a laser such that Rz of the base layer was 0.71 μm and a surface layer was formed such that the surface layer formed on the surface of the base layer had a film thickness of 2.2 μm.

[Test 6]

An intermediate transfer belt was manufactured in a similar manner to Test 1 except that the surface of the base layer was treated with a laser such that Rz of the base layer was 1.1 μm and a surface layer was formed such that the surface layer formed on the surface of the base layer had a film thickness of 3.9 μm.

[Test 7]

An intermediate transfer belt was manufactured in a similar manner to Test 1 except that the surface of the base layer was treated with a laser such that Rz of the base layer was 0.20 μm and a surface layer was formed such that the surface layer formed on the surface of the base layer had a film thickness of 0.48 μm.

[Test 8]

An intermediate transfer belt was manufactured in a similar manner to Test 1 except that the surface of the base layer was treated with a laser such that Rz of the base layer was 2.0 μm and a surface layer was formed such that the surface layer formed on the surface of the base layer had a film thickness of 6.3 μm.

[Test 9]

(Preparation of Base Layer)

The following components were thoroughly mixed in the following amounts using a mixer to prepare a base layer coating liquid.

Resin: 100 parts by mass

Conductive filler: 19 parts by mass

The resin is polyamide imide varnish (PAH, Vylomax HR-16NN (manufactured by Toyobo Co., Ltd.). The conductive filler is carbon black, SPECIAL BLACK 4 (manufactured by Degussa AG).

A stainless steel cylindrical die and a dispenser having a nozzle and capable of ejecting a fixed amount of liquid were prepared. While the die was rotated about the axis of the cylinder and the nozzle was moved in an axial direction, the base layer coating liquid was ejected from the nozzle. The base layer coating liquid was spirally applied onto an outer peripheral surface of the die to form a coating film in which the base layer coating liquid was continuous. While the die was rotated, the coating film was heated at 100° C. for one hour to remove a solvent, then further heated to 250° C., and held for one hour to form a base layer. The thickness of the base layer thus formed was 65 μm.

An intermediate transfer belt was manufactured in a similar manner to Test 1 except that the surface of the base layer was treated with a laser such that Rz of the base layer was 0.56 μm and a surface layer was formed such that the surface layer formed on the surface of the base layer had a film thickness of 2.1 μm.

[Test 10]

(Preparation of Base Layer)

The following components were thoroughly mixed in the following amounts using a mixer to prepare a base layer coating liquid.

Resin: 100 parts by mass

Conductive filler: 21 parts by mass

The resin is polyimide varnish (PI), U varnish-A (manufactured by Ube Industries, Ltd.). The conductive filler is carbon black, SPECIAL BLACK 4 (manufactured by Degussa AG).

A stainless steel cylindrical die and a dispenser having a nozzle and capable of ejecting a fixed amount of liquid were prepared. While the die was rotated about the axis of the cylinder and the nozzle was moved in an axial direction, the base layer coating liquid was ejected from the nozzle. The base layer coating liquid was spirally applied onto an outer peripheral surface of the die to form a coating film in which the base layer coating liquid was continuous. While the die was rotated, the coating film was heated at 100° C. for one hour to remove a solvent, then further heated to 350° C., and held for one hour to form a base layer. The thickness of the base layer thus formed was 68 μm.

An intermediate transfer belt was manufactured in a similar manner to Test 1 except that the surface of the base layer was treated with a laser such that Rz of the base layer was 0.57 μm and a surface layer was formed such that the surface layer formed on the surface of the base layer had a film thickness of 2.0 μm.

[Test 11]

An intermediate transfer belt was manufactured in a similar manner to Test 1 except that the surface was treated with a laser such that Rz of the base layer prepared in Test 1 was 0.53 μm, the time before applying the coating liquid to the surface of the base layer was changed from five minutes to three hours, and a surface layer was formed such that the surface layer had a film thickness of 4.3 μm.

[Test 12]

An intermediate transfer belt was manufactured in a similar manner to Test 1 except that the surface was treated with a laser such that Rz of the base layer prepared in Test 1 was 0.53 μm, the time before applying the coating liquid to the surface of the base layer was changed from five minutes to five hours, and a surface layer was formed such that the surface layer had a film thickness of 4.3 μm.

[Test 13]

An intermediate transfer belt was manufactured in a similar manner to Test 1 except that the surface was treated with a laser such that Rz of the base layer prepared in Test 1 was 0.53 μm, the time before applying the coating liquid to the surface of the base layer was changed from five minutes to one day, and a surface layer was formed such that the surface layer had a film thickness of 4.3 μm.

[Test 14]

An intermediate transfer belt was manufactured in a similar manner to Test 1 except that the laser treatment condition of the base layer prepared in Test 1 was changed from 532 nm to 1064 nm, the surface of the base layer was treated with a laser such that Rz of the base layer was 0.55 μm, and a surface layer was formed such that the surface layer formed on the surface of the base layer had a film thickness of 4.3 μm. The laser marker used is MD-X1020 (manufactured by Keyence Corporation).

[Test 15]

A value of Rz of the base layer was set to 0.19 μm so as to be equal to or more than a half of the film thickness of a surface layer to be formed, and a surface layer was formed so as to have a film thickness of 2.1 μm.

An intermediate transfer belt was manufactured by setting the other conditions similarly to Test 1.

[Test 16]

A value of Rz of the base layer was set to 1.1 μm so as to be equal to or more than a half of the film thickness of a surface layer to be formed, and a surface layer was formed so as to have a film thickness of 2.0 μm. An intermediate transfer belt was manufactured by setting the other conditions similarly to Test 1.

[Test 17]

A value of Rz of the base layer was set to 2.1 μm so as to be equal to or more than a half of the film thickness of a surface layer to be formed, and a surface layer was formed so as to have a film thickness of 3.9 μm. An intermediate transfer belt was manufactured by setting the other conditions similarly to Test 1.

[Test 18]

(Surface Treatment of Base Layer)

An intermediate transfer belt was manufactured in a similar manner to Test 1 except that the base layer was polished so as to have Rz of 0.22 μm by pressing a lapping film sheet "particle size 1 μm (#8000) (manufactured by 3M Japan Limited)" against a base on a biaxial roller via a rubber pad while the base layer was held by the roller and rotated at a linear speed of 130 mm/sec, and a surface layer was formed so as to have a film thickness of 4.1 μm.

[Test 19]

(Surface Treatment of Base Layer)

An intermediate transfer belt was manufactured in a similar manner to Test 1 except that the base layer was polished so as to have Rz of 0.56 μm by pressing a lapping film sheet "particle size 9 μm (#2000) (manufactured by 3M Japan Limited)" against a base on a biaxial roller via a rubber pad while the base layer was held by the roller and rotated at a linear speed of 130 mm/sec, and a surface layer was formed so as to have a film thickness of 3.8 μm.

[Test 20]

(Surface Treatment of Base Layer)

An intermediate transfer belt was manufactured in a similar manner to Test 1 except that the base layer was polished so as to have Rz of 1.1 μm by pressing a lapping film sheet "particle size 15 μm (#1000) (manufactured by 3M Japan Limited)" against a base on a biaxial roller via a rubber pad while the base layer was held by the roller and rotated at a linear speed of 130 mm/sec, and a surface layer was formed so as to have a film thickness of 2.0 μm.

[Test 21]

(Surface Treatment of Base Layer)

By grounding a cylindrical die and disposing an electrode of a corona discharge treatment machine 2 mm apart from the base layer prepared in Test 1, the base layer was surface-treated under a condition that application energy per unit area on a surface of the base layer was 183 $kJ/m^2$.

An intermediate transfer belt was manufactured in a similar manner to Test 1 except that the base layer was subjected to a corona treatment such that Rz of the base layer was 0.09 μm and a surface layer was formed such that the surface layer had a film thickness of 2.2 μm.

[Test 22]

An intermediate transfer belt was manufactured with a similar value of Rz and a similar film thickness of a surface layer to Test 21 except that the application energy per unit area on the surface of the base layer was changed from 183 $kJ/m^2$ to 365 $kJ/m^2$.

[Test 23]

An intermediate transfer belt was manufactured with a similar value of Rz and a similar film thickness of a surface layer to Test 21 except that the application energy per unit area on the surface of the base layer was changed from 183 $kJ/m^2$ to 548 $kJ/m^2$.

[Test 24]

An intermediate transfer belt was manufactured in a similar manner to Test 1 except that the base layer was subjected to a polishing treatment and a corona treatment according to Test 18 and Test 22, respectively, such that Rz of the base layer was 0.22 μm and a surface layer was formed such that the surface layer had a film thickness of 2.2 μm.

A durability test and image evaluation were performed for each of the intermediate transfer belts obtained in the above Tests 1 to 24 under the following conditions.

(Durability Test Method)

Each of the intermediate transfer belts obtained in Tests 1 to 24 was mounted on a color multifunction machine "bizhub C368 (manufactured by Konica Minolta, Inc.)", and an image with a coverage rate of 5.0% was printed on one million neutral sheets at 20° C. and 50% RH. Thereafter, the following image evaluation was performed.

(Image Evaluation)

A color multifunction machine "bizhub C368" (manufactured by Konica Minolta, Inc.) was prepared. Each of the intermediate transfer belts obtained in Tests 1 to 24 was mounted on this machine. A solid image of cyan halftone (gradation 120) was output on a neutral sheet. Next, the image density of the solid image was captured by a scanner. An average density was calculated by image processing using Photoshop (registered trademark, manufactured by Adobe). Transferability was evaluated according to the following evaluation criteria.

(Evaluation Criteria)

B or higher among the following criteria A to D was acceptable.

A: Area ratio of average density of 90% or less is 2% or less

B: Area ratio of average density of 90% or less is more than 2% and 3% or less

C: Area ratio of average density of 90% or less is more than 3% and 5% or less

D: Area ratio of average density of 90% or less is more than 5%

Image evaluation results after the durability test for the intermediate transfer belts are illustrated in Tables 1 and 2.

to be affected by heat generated by laser irradiation. Furthermore, it is possible to prevent degradation of dispersibility of the conductive filler at the center of a laser irradiation spot with highest energy. As a result, it is considered that the evaluation result is stable.

In any case where polishing or a corona treatment was selected as a surface treatment method of the base layer, it was impossible to obtain a result satisfying the evaluation criteria. Also in a case where the application energy per unit area of the corona treatment was increased, a similar result was obtained. In a case where the corona treatment was performed after polishing, the image evaluation result was

TABLE 1

| | Base layer | Roughening means | Elapsed time from roughening processing to formation of surface layer | Rz of base layer [um] | Film thickness of surface layer [um] | Image evaluation result after durability test |
|---|---|---|---|---|---|---|
| Test 1 | PPS | Laser processing (Wavelength 532 nm) | 5 min | 0.20 | 0.51 | A |
| Test 2 | PPS | Laser processing (Wavelength 532 nm) | 5 min | 0.20 | 4.2 | A |
| Test 3 | PPS | Laser processing (Wavelength 532 nm) | 5 min | 0.53 | 2.1 | A |
| Test 4 | PPS | Laser processing (Wavelength 532 nm) | 5 min | 0.53 | 4.3 | A |
| Test 5 | PPS | Laser processing (Wavelength 532 nm) | 5 min | 0.71 | 2.2 | A |
| Test 6 | PPS | Laser processing (Wavelength 532 nm) | 5 min | 1.1 | 3.9 | A |
| Test 7 | PPS | Laser processing (Wavelength 532 nm) | 5 min | 0.20 | 0.48 | B |
| Test 8 | PPS | Laser processing (Wavelength 532 nm) | 5 min | 2.0 | 6.3 | B |
| Test 9 | PAI | Laser processing (Wavelength 532 nm) | 5 min | 0.56 | 2.1 | A |
| Test 10 | PI | Laser processing (Wavelength 532 nm) | 5 min | 0.57 | 2.0 | A |
| Test 11 | PPS | Laser processing (Wavelength 532 nm) | 3 h | 0.53 | 4.3 | A |
| Test 12 | PPS | Laser processing (Wavelength 532 nm) | 5 h | 0.53 | 4.3 | A |
| Test 13 | PPS | Laser processing (Wavelength 532 nm) | One day | 0.53 | 4.3 | B |
| Test 14 | PPS | Laser processing (Wavelength 1064 nm) | 5 min | 0.55 | 4.3 | B |

TABLE 2

| | Base layer | Roughening means | Elapsed time from roughening processing to formation of surface layer | Rz of base layer [um] | Film thickness of surface layer [um] | Image evaluation result after durability test |
|---|---|---|---|---|---|---|
| Test 15 | PPS | Laser processing (Wavelength 532 nm) | 5 min | 0.19 | 2.1 | C |
| Test 16 | PPS | Laser processing (Wavelength 532 nm) | 5 min | 1.1 | 2.0 | C |
| Test 17 | PPS | Laser processing (Wavelength 532 nm) | 5 min | 2.1 | 3.9 | C |
| Test 18 | PPS | Polishing | 5 min | 0.22 | 4.1 | D |
| Test 19 | PPS | Polishing | 5 min | 0.56 | 3.8 | D |
| Test 20 | PPS | Polishing | 5 min | 1.1 | 2.0 | D |
| Test 21 | PPS | Corona treatment (183 kJ/m$^2$) | 5 min | 0.09 | 2.2 | Evaluation was impossible because of entire peeling |
| Test 22 | PPS | Corona treatment (365 kJ/m$^2$) | 5 min | 0.09 | 2.2 | Evaluation was impossible because of entire peeling |
| Test 23 | PPS | Corona treatment (548 kJ/m$^2$) | 5 min | 0.09 | 2.2 | D |
| Test 24 | PPS | Polishing + Corona treatment (365 kJ/m$^2$) | 5 min | 0.22 | 2.2 | D |

As obvious from Tables 1 and 2, by setting Rz (in accordance with JIS-B0601-2001) of the base layer to 0.2 µm or more and setting Rz so as to be equal to or less than a half of the film thickness of a surface layer to be formed on a surface of the base layer, favorable image evaluation after the durability test was obtained.

In addition, it was found that favorable image evaluation after the durability test was obtained by setting the time before applying the coating liquid to the surface of the base layer within 10 hours.

In addition, the evaluation result is more stable when the laser wavelength is set to 532 nm than when the laser wavelength is set to 1064 nm. It is considered that this is because the case where the laser wavelength is set to 532 nm has a higher absorptance on the surface of the substrate, and makes it more difficult for a deeper portion of the base layer slightly higher than that in a case where only polishing or only the corona treatment was performed, but was not as high as that in a case where a laser treatment was performed. Therefore, it was found that laser processing was the most suitable.

An embodiment of the present invention is useful as a method for manufacturing an intermediate transfer belt without causing partial peeling or cracking of a surface layer.

Although embodiments of the present invention have been described and illustrated in detail, the disclosed embodiments are made for purposes of illustration and example only and not limitation. The scope of the present invention should be interpreted by terms of the appended claims.

What is claimed is:

1. A method for manufacturing an intermediate transfer belt having at least a base layer and a surface layer formed in contact with a surface of the base layer, comprising:
    irradiating the surface of the base layer with a laser such that Rz (in accordance with JIS-B0601-2001) is 0.2 μm or more and equal to or less than a half of a film thickness of the surface layer to be formed; and
    forming the surface layer on the surface of the base layer irradiated with the laser.

2. The method for manufacturing an intermediate transfer belt according to claim 1, wherein the emitted laser is a laser having a wavelength within a visible light region.

3. The method for manufacturing an intermediate transfer belt according to claim 1, wherein the forming forms the surface layer having a film thickness of 0.5 μm or more and 6.0 μm or less.

4. The method for manufacturing an intermediate transfer belt according to claim 1, wherein the forming is performed within 10 hours after the irradiating.

5. The method for manufacturing an intermediate transfer belt according to claim 1, wherein the base layer is formed of a resin material selected from a group consisting of polyphenylene sulfide (PPS), polyamide imide (PAI), and polyimide (PI).

6. The method for manufacturing an intermediate transfer belt according to claim 1, wherein the forming includes:
    applying a coating liquid containing a photocurable monomer to the surface of the base layer irradiated with the laser; and irradiating the coating liquid that has been applied with an actinic ray.

7. The method for manufacturing an intermediate transfer belt according to claim 6, wherein the photocurable monomer is a (meth)acrylate.

8. The method for manufacturing an intermediate transfer belt according to claim 6, wherein the photocurable monomer is a polyfunctional (meth)acrylate.

9. The method for manufacturing an intermediate transfer belt according to claim 6, wherein the photocurable monomer is a polyfunctional (meth)acrylate, and the base layer is formed of polyphenylene sulfide (PPS).

* * * * *